United States Patent [19]

Rauch

[11] Patent Number: 4,540,136

[45] Date of Patent: Sep. 10, 1985

[54] FISHING LINE LOADER APPARATUS

[76] Inventor: William H. Rauch, 640 Glendale, Deshler, Ohio 43516

[21] Appl. No.: 619,773

[22] Filed: Jun. 11, 1984

[51] Int. Cl.³ .................... B65H 49/00; A01K 89/00
[52] U.S. Cl. ................................ 242/106; 242/150 R
[58] Field of Search ................... 242/86.5 R, 86.5 A, 242/106, 150 R, 129.6, 129.62, 129.72

[56] References Cited

U.S. PATENT DOCUMENTS

| | | | |
|---|---|---|---|
| 268,235 | 11/1882 | Hubbard | 242/106 |
| 315,803 | 4/1885 | Logan | 242/86.5 R |
| 1,060,198 | 4/1913 | Maitland | 242/129.72 |
| 2,111,527 | 3/1938 | Blanc | 242/86.5 R X |
| 2,734,694 | 2/1956 | Davidson | 242/106 |
| 3,026,059 | 3/1962 | Dennler | 242/106 X |
| 3,521,834 | 7/1970 | Kauffman | 242/129.72 |
| 4,007,886 | 2/1977 | Kaminstein | 242/106 X |
| 4,334,380 | 6/1982 | Daniels | 242/106 X |
| 4,451,014 | 5/1984 | Kitt | 242/129.6 |

FOREIGN PATENT DOCUMENTS 454645  2/1913  France ............................. 242/129.62

Primary Examiner—Stuart S. Levy
Assistant Examiner—Lloyd D. Doigan
Attorney, Agent, or Firm—Emch, Schaffer, Schaub & Procello Co.

[57] ABSTRACT

A fishing line loader is disclosed. The loader includes a base, upstanding sidewalls and a shaft. A fishing line spool may be mounted on the shaft between two disks. A crank is provided on the shaft and a clutch has drive pins which extend through one of the disks to drive the fishing line spool. An elastomeric bearing urges one of the disks against the fishing line spool to restrict rotation of the spool relative to the shaft. Guides define a path for the fishing line in a direction parallel to the shaft.

8 Claims, 3 Drawing Figures

FISHING LINE LOADER APPARATUS

BACKGROUND OF THE INVENTION

The present invention relates to a fishing line loader which is used in applying fishing line from a spool to a fishing reel and also for returning line from a fishing reel to the fishing line spool.

To be usable, a fishing line loader must be able to both discharge and pickup fishing line from both spinning and spin-casting reels together with casting reels. With respect to the former, the axis of the reel is parallel to the fishing rod, while in a casting reel, the axis is perpendicular to the fishing rod.

Therefore, particularly when using monofilament lines, it is important that the fishing line be removed from the spool and placed on the reel correctly, with the preset looping of the line on the spool corresponding with the rotation of the reel.

In addition, a loader must have the flexibility for use not only on a workbench but also in the field at a fishing site.

SUMMARY OF THE INVENTION

The fishing line loader, according to the present invention supplies the capability of loading and unloading fishing line in a correct direction for both spinning and casting reels together with spin-cast reels. In addition, the fishing line loader, according to the present invention, may be mounted on and used at a workbench and also used at a fishing site.

The loader includes a base member, upstanding sidewalls and a rotatable shaft mounted between the sidewalls. A fishing line spool may be mounted on the shaft between two disks, which are also mounted on the shaft. A crank is provided on one end of the shaft and a clutch member has drive pins which extend through one of the disks to drive the fishing line spool during recovery of fishing line. An elastomeric bearing urges one of the disks against the spool to restrict rotation of the spool relative to the shaft. Guides define a path for the fishing line in a direction parallel to the shaft. Bracket means are provided for adjustably mounting the base member to a work surface.

DETAILED DESCRIPTION OF THE PREFERRED EMBODIMENT

Figure 1:
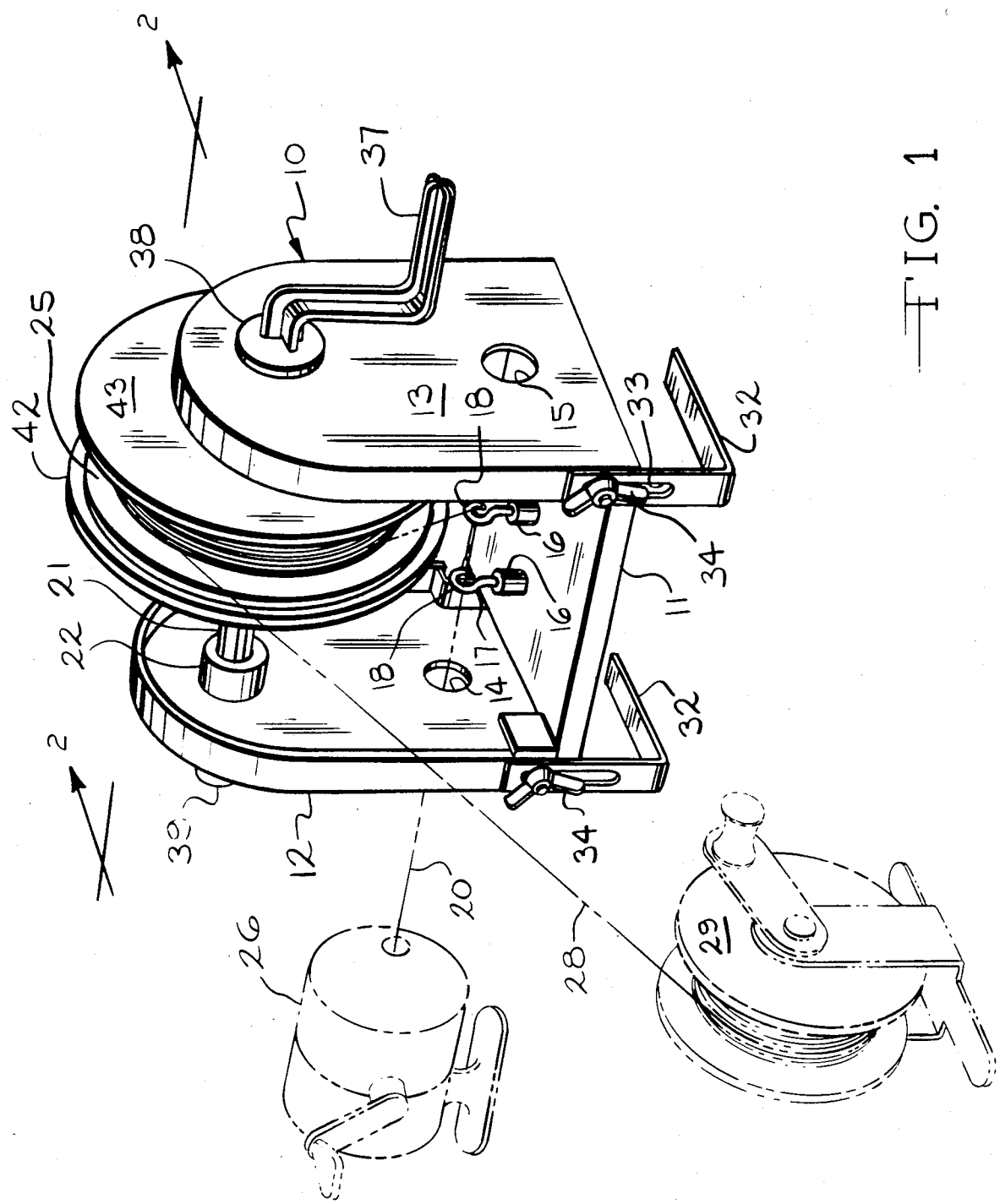
FIG. 1 is a perspective view of a fishing line loader, according to the the present invention, and showing diagrammatically the positioning of a spin casting reel and a casting reel during loading or unloading of fishing line.

A fishing line loader, according to the present invention is generally indicated by the reference number 10. The loader 10 includes a base member 11 and a pair of opposed sidewalls 12 and 13, which are mounted on and extend upwardly from the base member 11. The sidewalls 12 and 13 define line guide openings 14 and 15.

Figure 2:
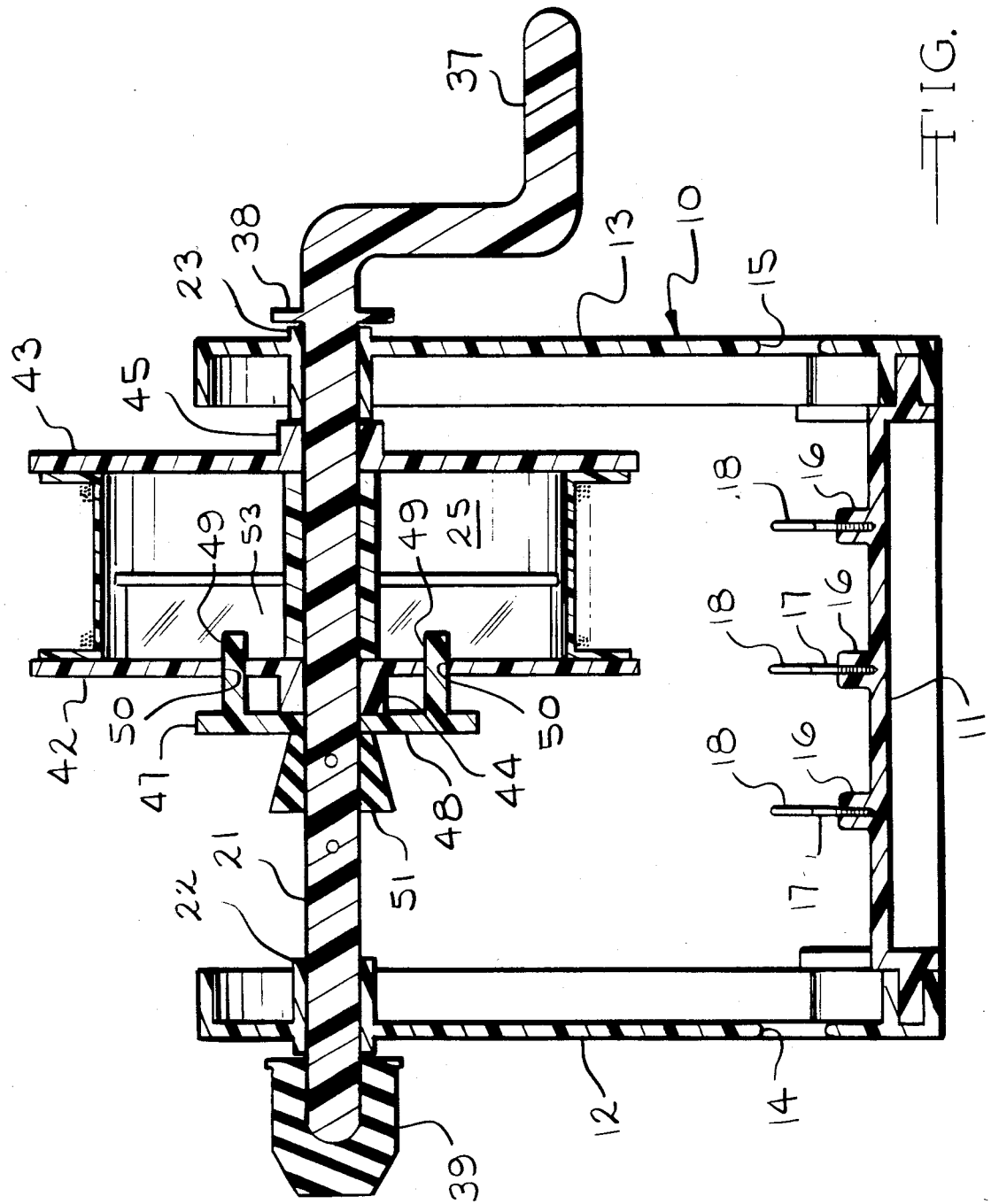
FIG. 2 is an enlarged cross-sectional view taken along the line 2—2 of FIG. 1.

Referring to FIG. 2, three integral bosses 16 extend upwardly from the base member 11 and mount screweyes 17. The screweyes 17 each include an upper ring 18 which is in alignment with the other rings 18 and also with the guide openings 15. The guide openings 15 and the rings 18 define a path 20 which is parallel to a shaft 21 rotatively mounted between the sidewalls 12 and 13 in integral bearing hubs 22, 23. A fishing line spool 25 may be rotatably mounted on the shaft 21. A fishing line may be removed from the spool 25 along the path 20 when the line is being placed on a spinning or spin-casting reel 26, as shown in FIG. 1. In the alternative, the fishing line may be moved along a path 28 in a direction generally perpendicular to the shaft 21 when the fishing line is applied to a casting reel or still-fishing reel 29 as indicated in FIG. 1.

Figure 3:
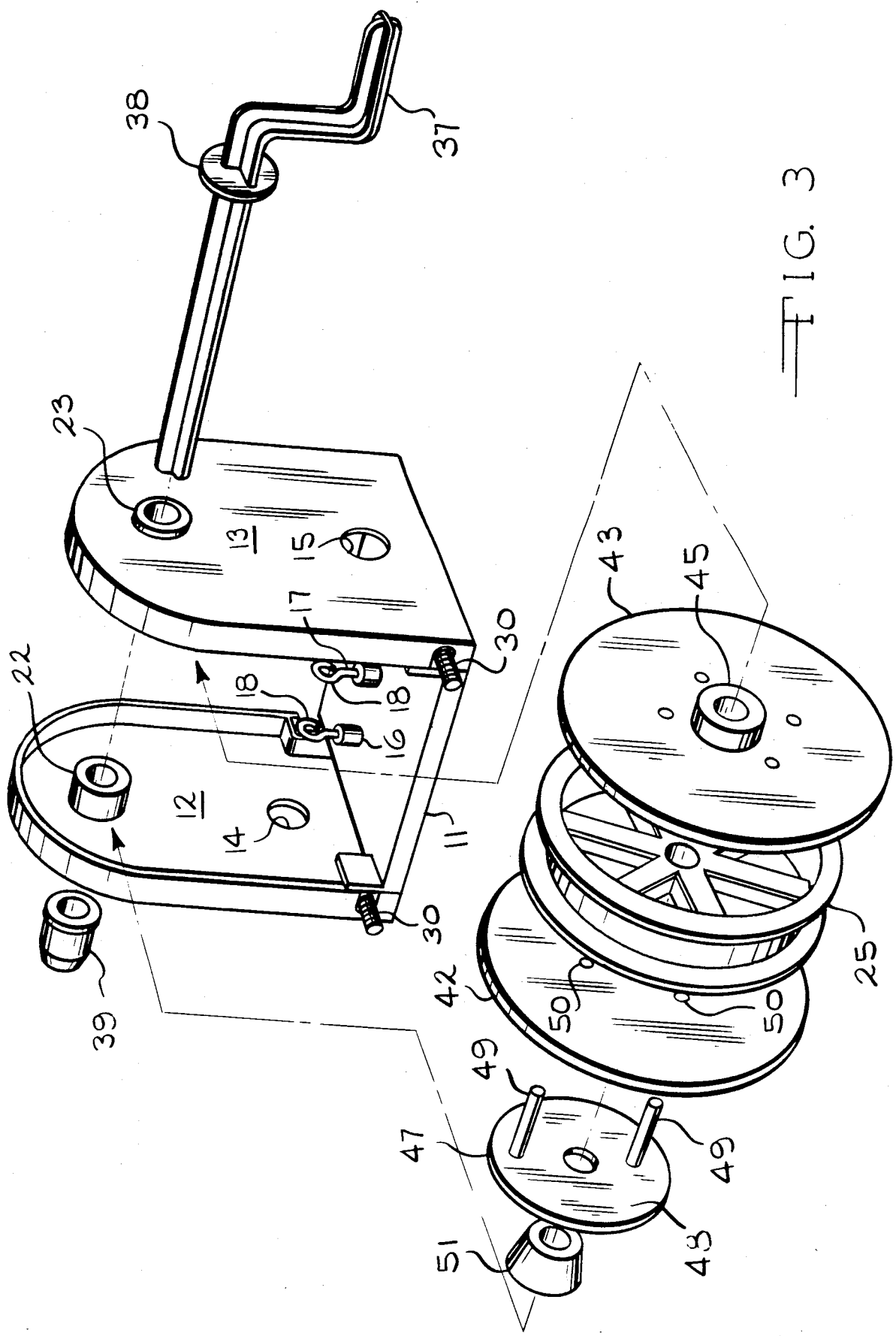
FIG. 3 is an exploded view of the fishing line loader shown in FIG. 1.

Referring to FIGS. 3 and 1, a pair of captive screws 30 extend outwardly from the sidewalls 12 and 13, adjacent the base member 11 and adjustably mount a pair of L-shaped brackets 32. The L-shaped brackets 32 define vertically extending slots 33 which receive the threaded ends of the screws 30. Wing nuts 34 are mounted on the ends of the screws 30 to adjustably position the L-shaped brackets 32. Because the brackets 32 are vertically adjustable, the holder 10 may be mounted on varying work surfaces both in a workbench setting and also at a fishing site.

Referring to FIG. 2., the shaft 21 includes an integral crank 37 and a stop flange 38, which limits the horizontal travel of the shaft 21. A cap 39 is mounted on the other end of the shaft 21 and acts as a stop member to limit horizontal movement of the shaft 21 in the other direction. The cap 39 is removed during the positioning or removal of the fishing line spool 25 from the shaft 21. A pair of disks 42 and 43 having integral bearing hubs 44 and 45 are rotatably mounted on the shaft 21 on opposite sides of the fishing line spool 25. A clutch member 47 including a clutch plate 48 and outwardly extending drive pins 49 are mounted on the shaft 21 adjacent the disk 42. The disk 42 defines drive holes 50 which receives the clutch drive pins 49.

An elastomeric bearing 51 is mounted on the shaft 21 adjacent the disk 42. When it is desired to remove fishing line from the fishing line spool 25, it is preferable that a friction force be placed on the spool 25 so that it does not free-wheel. Accordingly, the elastomeric bearing 51 is moved to the right to frictionally load the various components and provide the necessary frictional forces which prevent free-wheeling. Specifically, the bearing is positioned against the plate 48 which engages the hub 44 of the disk 42. The disk 42 contacts the fishing line spool 25 which in turn engages the disk 43. Lastly, the hub 45 of the disk 43 is positioned against the hub 23 of the sidewall 13. It has been found that the elastomeric bearing 51 may be adjusted to provide the correct frictional forces for varying sizes of spools.

To reload fishing line from fishing reels or from another source point to the fishing line spool 25, the crank 37 is used. When the elastomeric bearing 51 is in the position shown in FIG. 2, the clutch drive pins 49 are positioned through the drive holes 50 of the disk 42. The drive pins 49 engage and rotate a surface 53 of the fishing line spool 25. This rotates the spool 25 and the fishing line is returned to the spool 25.

In the present embodiment, the majority of the parts with the exception of the end cap 39 and the elastomeric bearing 51 are constructed of plastic components however, metal components may be utilized.

It has been found that the fishing line loader 10, according to the present invention provides a quick and correct method of both loading and unloading fishing reels both in a workshop and in the field.

Changes in the preferred embodiment of the invention may be made without departing from the following claims.

What I claim:

1. A fishing line loader comprising, in combination, a base, opposed sidewalls extending upwardly from said base, a shaft mounted for rotation between said sidewalls, whereby a fishing line spool may be mounted for rotation on said shaft, at least one disk mounted on said shaft adjacent such fishing line spool, and an elastomeric bearing on said shaft adjacent said disk for urging said disk against such fishing line spool, whereby such fishing line spool has restricted rotation relative to said shaft, guide means on said base for transporting fishing line from or to such fishing line spool in a direction parallel to said shaft, a crank on one end of said shaft and clutch means for operatively connecting said crank to said fishing line spool, said clutch means including at least one drive rod for engaging said fishing line spool said disc defining at least one drive opening for the rection of said drive rod, whereby upon rotation of said crank said drive pin engages and rotates such fishing line spool.

2. A fishing line loader comprising, in combination, a base, opposed sidewalls extending upwardly from said base, a shaft mounted for rotation between said sidewalls, whereby a fishing line spool may be mounted for rotation on said shaft, at least one disk mounted on said shaft adjacent such fishing line spool, and an elastomeric bearing on said shaft adjacent said disk for urging said disk against such fishing line spool, whereby such fishing line spool has restricted rotation relative to said shaft, guide means on said base for transporting fishing line from or to such fishing line spool in a direction parallel to said shaft, a crank on one end of said shaft and clutch means for operatively connecting said crank to said fishing line spool, said clutch means including a plate mounted on said shaft adjacent said disk, said elastomeric bearing operatively connecting said plate to said shaft, said disk defining at least two drive openings, drive rods extending from said plate through said drive openings and into an operational relationship with such fishing line spool, whereby upon rotation of said crank said drive pins engage and rotate such fishing line spool.

3. A fishing line loader, according to, claim 2 wherein said sidewalls each define an opening and said guide means include a plurality of rings mounted in alignment with such opening.

4. A fishing line loader, according to, claim 2 including bracket means adjacent said base for removably attaching said base to a work surface.

5. A fishing line loader, according to claim 2, including bracket means adjacent said base for removably attaching said base to a work surface, said bracket means including a pair of "L" shaped brackets, ech of said brackets defining a vertically extending slot and fastening means extending through said slot for adjustively mounting each of said brackets.

6. A fishing line loader comprising, in combination a base member, a pair of opposed sidewalls extending upwardly from said base member, a shaft mounted for rotation between said sidewalls, whereby a fishing line spool may be mounted on said shaft, a pair of disks mounted on said shaft on opposite sides of such fishing line spool, one of said disks defining at least two drive holes, a crank mounted at one end of said shaft, a stop member mounted at the other end of said shaft, clutch means mounted on said shaft for operatively connecting said crank to said fishing line spool, said clutch means including a plate mounted on said shaft and a plurality of drive pins extending through said drive holes, said drive pins driving such fishing line spool and an elastomeric bearing on said shaft adjacent said clutch plate for urging said disks against such fishing line spool, wherein such fishing line spool has restricted relative to said shaft.

7. A fishing line loader, according to claim 6, including guide means on said base and said sidewalls for transporting fishing line from or to such fishing line spool in a direction parallel to said shaft, said guide means including aligned openings defined in said sidewalls and a plurality of rings in alignment with said openings in said sidewalls and parallel to said shaft.

8. A fishing line loader, according to claim 6, including bracket means adjacent said base for removably attaching said base to a work surface, said bracket means including a pair of "L" shaped brackets, each of said brackets defining a vertically extending slot and fastening means extending through said slot for adjustively mounting each of said brackets.

* * * * *